(No Model.)
N. NELSON.
SNAP HOOK.
No. 429,362. Patented June 3, 1890.
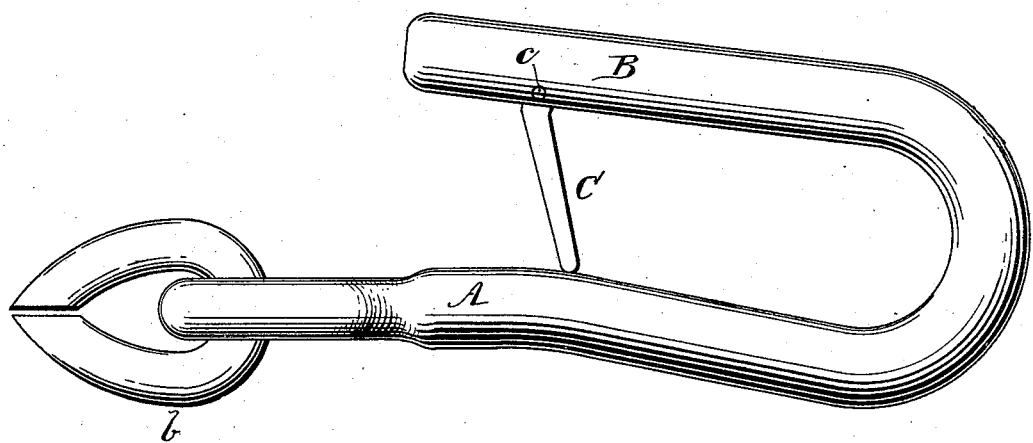
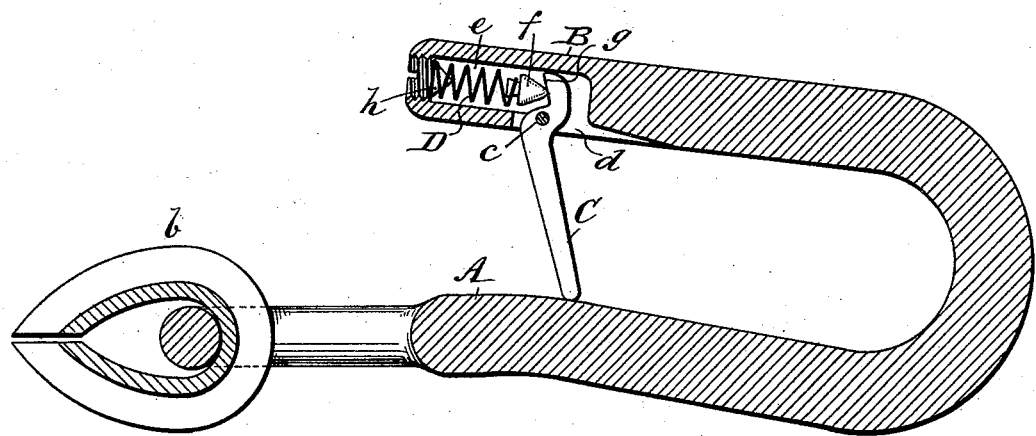
WITNESSES:
H. Walker
C. Sedgwick
INVENTOR:
N. Nelson
BY Munn & Co.
ATTORNEYS

UNITED STATES PATENT OFFICE.

NELS NELSON, OF ABERDEEN, WASHINGTON, ASSIGNOR OF ONE-HALF TO JAY G. WEATHERWAY, OF SAME PLACE.

SNAP-HOOK.

SPECIFICATION forming part of Letters Patent No. 429,362, dated June 3, 1890.

Application filed January 28, 1890. Serial No. 338,339. (No model.)

*To all whom it may concern:*

Be it known that I, NELS NELSON, of Aberdeen, in the county of Chehalis and State of Washington, have invented a new and useful Improvement in Hooks for Towing and for other Purposes, of which the following is a full, clear, and exact description.

This invention relates to snap-hooks, and has mainly for its object the production of such a hook which, although applicable to other purposes or wherever a hook does not require to be tied to make it secure against becoming accidentally disengaged from the body or article it hooks with, is mainly designed to be used on vessels, and more particularly for towing rafts of logs, and which as so applied will not only be perfectly safe or secure against unhooking when dropped into the ring it engages with, but is simple, not liable to get out of order, and will last for years, even when exposed to salt-water.

In towing rafts of logs the ordinary hook which is used for the purpose requires to be tied to keep it from falling out of the ring in the boom-chain, and as often the ring is underneath the boom-sticks the man employed in engaging the hook has to reach down under the water to effect its engagement, and under such circumstances it is almost impossible to tie the hook to prevent it from becoming disengaged, the consequence of which has been that many a raft of logs has gone to sea or been lost. As hooks for such a purpose are necessarily heavy and exposed to rough usage, a snap-hook to be used therefor must be made unusually strong and its latch and the spring controlling the latch be specially arranged to insure not only the quick and easy application of the hook to the ring in the boom-chain, but so that when dropped into the ring it will be securely locked therein and the spring controlling the latch be protected from injury. My improved snap-hook very effectually secures these results; and it consists in a novel construction and combination of parts, substantially as hereinafter described, and pointed out in the claim.

Reference is to be had to the accompanying drawings, forming a part of this specification, in which similar letters of reference indicate corresponding parts in both the figures.

Figure 1 represents a side view of my improved hook, and Fig. 2 a mainly sectional longitudinal view of the same in a plane parallel with Fig. 1.

A indicates the shank of the snap-hook, which may have the usual thimble $b$, and B is its point or nose portion.

C is the latch, pivoted, as at $c$, to the nose part of the hook and bearing at its outer end when closed against the shank A. This latch, which is of a crooked or angular step shape at its inner end, is fitted to work at said end within a slot $d$, that opens through the inner side of the nose part of the hook and that is in communication with a longitudinal hole $e$ in said nose part and opening through the outer extremity of the nose of the hook. This passage $e$ serves to receive and contain within it a spiral spring D, that serves to keep the latch C closed against the shank of the hook and only yields by the movement of the latch when the hook is being engaged with the ring. Said spring D carries at its free end a swivel stud or cone $f$, which bears against the stepped portion $g$ of the latch and is free to turn or move on it as the latch is opened or closed, while the opposite or fixed end of the spring rests on and around a conical pointed or centering screw-plug $h$, that closes the outer end of the aperture $e$. Thus supported the spring is free to adjust itself in all directions, which will add materially to its durability. The spring, too, is not only under cover by the hook to protect it from fouling or becoming injured, but, being arranged within the nose of the hook, and the latch being attached at such part, the hook is not weakened, as it would be were the latch to be pivoted to the shank of the hook and the inclosed spring arranged within said shank.

Having thus described my invention, what I claim as new, and desire to secure by Letters Patent, is—

The combination, with the shank A of the hook and with its nose end portion B, having a slot $d$ on its inner side and longitudinal aperture $e$, of the stepped latch C, pivoted to said nose end part, the loose spiral spring D, inclosed within the nose of the hook, the swivel stud or cone $f$ at the one end of said spring, and the centering screw-plug $h$ at the opposite end thereof, essentially as shown and described.

NELS NELSON.

Witnesses:
J. D. MOREHEAD,
G. S. THOMAS.